United States Statutory Invention Registration [19]

Riley et al.

[11] Reg. Number: H321

[43] Published: Aug. 4, 1987

[54] MACHINED TWO-PIECE MICROWAVE WAVEGUIDE

[75] Inventors: Marc J. Riley, Pasadena; Harold E. Sterner, Crownsville, both of Md.

[73] Assignee: The United States of America as represented by the Secretary of the Air Force, Washington, D.C.

[21] Appl. No.: 587,432

[22] Filed: Mar. 8, 1984

[51] Int. Cl.[4] ..... H01P 3/00

[52] U.S. Cl. ..... 333/239; 333/254

[58] Field of Search ..... 333/239, 249, 248, 254; 29/600; 138/156, 157

[56] References Cited

U.S. PATENT DOCUMENTS

| | | | |
|---|---|---|---|
| 2,793,989 | 5/1957 | Goodman et al. | 204/9 |
| 2,995,806 | 8/1961 | Allison et al. | 29/600 |
| 2,995,806 | 8/1961 | Allison et al. | 29/155.5 |
| 2,996,790 | 8/1961 | Trafford | 29/600 |
| 2,996,790 | 8/1961 | Trafford | 29/155.5 |
| 3,157,847 | 11/1964 | Williams | 333/239 |
| 3,345,590 | 10/1967 | Wolfgang et al. | 333/95 |
| 3,949,327 | 4/1976 | Chapell | 333/239 X |
| 4,052,683 | 10/1977 | Van Heuven et al. | 333/239 X |

FOREIGN PATENT DOCUMENTS

| | | | |
|---|---|---|---|
| 758457 | 10/1956 | United Kingdom | 333/239 |

OTHER PUBLICATIONS

Beardow T.; "Waveguide Manufacturing Techniques"; *British Communication and Electronics;* Oct. 1958; pp. 772–778.

*Primary Examiner*—S. C. Buczinski
*Assistant Examiner*—Linda J. Wallace
*Attorney, Agent, or Firm*—Donald J. Singer; Stanton E. Collier

[57] ABSTRACT

Machineable microwave waveguide apparatus and method for constructing same. Waveguide functions as an interconnecting waveguide channel between two parallel microwave ports which have an axial offset. The waveguide is comprised of two complimentary halves with C-shaped cross-section, the two halves fitting together to form a single unit. The fit-together unit is capped, and can be sealed for pressure-tight applications.

1 Claim, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MACHINED TWO-PIECE MICROWAVE WAVEGUIDE

STATEMENT OF GOVERNMENT INTEREST

The invention described herein may be manufactured and used by or for the Government for governmental purposes without the payment of any royalty thereon.

BACKGROUND OF THE INVENTION

The present invention relates to a waveguide device and a method of forming same. More particularly, the invention is directed to a machined two-piece waveguide structure and method of manufacturing same for use in microwave network applications.

Waveguides are a well known type of electric transmission line. Waveguides serve as structural guides within which waves may be directed from a source to an end destination. Waveguides may take various formats, including straight, elbow, hybrids and transitional sections.

At the present time, the most popular means of connecting two offset ports in a waveguide system is by means of a flexible type of waveguide or by a series of elbow bends and interconnecting waveguide. The flexible waveguide is available with and without inner double ridges depending on its application. It is capped with flanges and then bent to the desired offset. Its major advantage is its flexibility, its major disadvantage however is that it requires a longer length to perform an offset when compared to the multicomponent and machined type waveguides. As well, the electrical performance of the flexible type waveguide is lesser than that of the machined or multicomponent types. Thus a flexible type waveguide may exhibit a higher voltage standing wave ratio (VSWR) as compared to a machined waveguide or multicomponent waveguide of similar configuration.

The multicomponent type waveguides, comprising a series of bends, are made by combining commercially available elbows and lengths of straight waveguide. These types of assembled bends provide good electrical performance, with a moderate VSWR, but component and assembly costs can be relatively high for large scale applications. An alternative means of waveguide manufacture where a good VSWR can be obtained is by means of extrusion. However, single quantity production of specially configured waveguide assemblies is not practical in application of this method.

In the prior art it is known to manufacture waveguides out of a series of prefabricated pieces, as disclosed in U.S. Pat. No. 2,793,989. It is also known to assemble a waveguide out of prefabricated mating pieces, where tabs, interacting with slots, are folded over to secure components of the waveguide structure together, such as disclosed in U.S. Pat. No. 2,995,806. These and other like approaches suffer from the need for an excessive number of prefabricated pieces and an excessive number of assembly steps.

SUMMARY OF THE INVENTION

It is therefore an object of the present invention to overcome the drawbacks of flexible waveguides.

It is another object of the present invention to overcome the drawbacks of multicomponent waveguides.

It is yet another feature of the present invention to combine the versatility and low cost of flexible type waveguides with the electrical performance and short lengths of extruded and multicomponent type waveguides.

It is an additional object of the present invention to provide a simplified and versatile method of manufacture of two-piece waveguide devices.

The present invention relates to a machineable microwave waveguide assembly and method for constructing same. The waveguide assembly functions as an interconnecting channel between two parallel microwave ports which have an axial offset. In a preferred embodiment, an S-bend waveguide assembly comprises two complimentary S-shaped halves with C-shaped cross-section, each half being milled out of a separate piece of selected material. The two halves fit together to form a single unit. The fit-together unit is capped with flanges and the capped unit is then soldered or dip brazed to make one complete waveguide assembly.

DESCRIPTION OF THE DRAWINGS

The present invention will be more clearly understood by reference to the following detailed description of a preferred embodiment thereof in conjunction with the accompanying drawings, in which.

DETAILED DESCRIPTION OF THE PREFERRED EMBODIMENT

Figure 1:
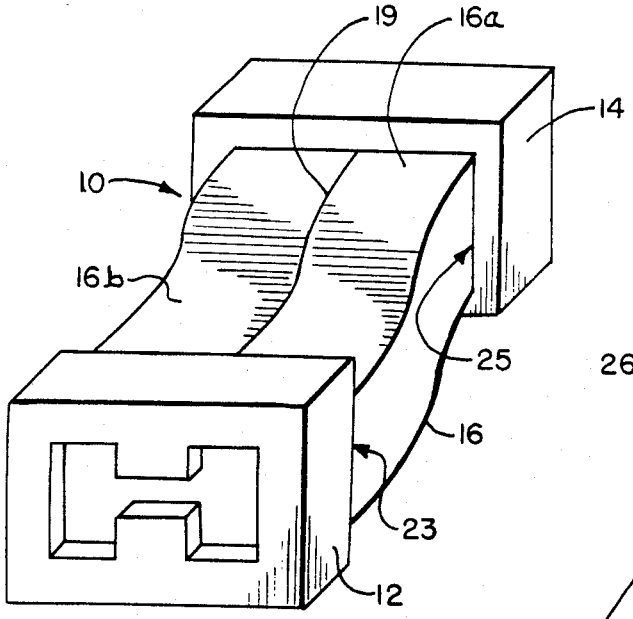
FIG. 1 is a perspective view of a preferred embodiment of the present invention.

Referring now to FIG. 1 there is shown a preferred embodiment of waveguide assembly 10 comprising flange plates 12, 14 and waveguide section 16. Waveguide section 16 is comprised of two mirror image elements **16*a* and 16*b* which are mated together at seam 19, as shown. Waveguide section 16 is capped at its respective ends 23, 25 by means of flange plates 12, 14, respectively, as shown. In the preferred embodiment of FIG. 1, waveguide section 16** is further defined as an S-bend waveguide section.

Figure 2:
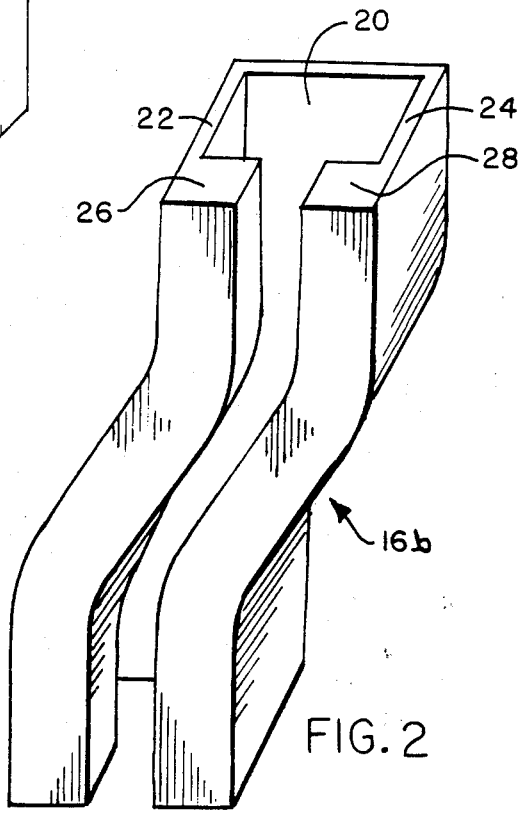
FIG. 2 is a pictorial view of one half of an S-bend waveguide section made in practice of the present invention.

Referring now to FIG. 2, a pictorial view of element **16*b* of waveguide section 16 of FIG. 1 is shown. The embodiment of element 16*b* as seen in FIG. 2 is shown having end wall 20 and sidewalls 22, 24 which extend longitudinally along the length of element 16*b*. Also shown are flanges 26, 28. Thus a cavity is shown within element 16*b* defined by flanges 26, 28, sidewalls 22, 24 and end wall 20. Element 16*a* of waveguide section 16 is configured as a mirror image of element 16*b*. Elements 16*a* and 16*b* are mated together to form waveguide section 16, as indicated by seam 19 shown in FIG. 1**.

Figure 3:
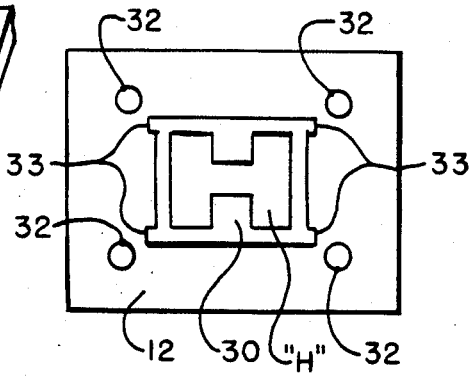
FIG. 3 is a plan view of the interior face of a typical flange plate made in practice of the present invention.

Referring now to FIG. 3, there is shown the configuration of the interior face of a typical flange plate 12 (or 14). A hole in the shape of a letter "H" is defined within flange plate 12 (or 14). This hole "H" is further defined on the surface of flange plate 12 (or 14) by pocket 30 which comprises a shallow recess in the face of flange plate 12 (or 14). Also seen in FIG. 3 are mounting holes 32, by means of which flange plate 12 (or 14) can be mounted to an external device. It will be appreciated by those skilled in the art that the internal configuration of waveguide section 16 comprises an "H" shape corresponding in configuration to the hole "H" defined in flange plate 12 (or 14), and that elements 16*a* and 16*b* each internally define complimentary halves of the "H" shape defined by the combination thereof.

Figure 4:
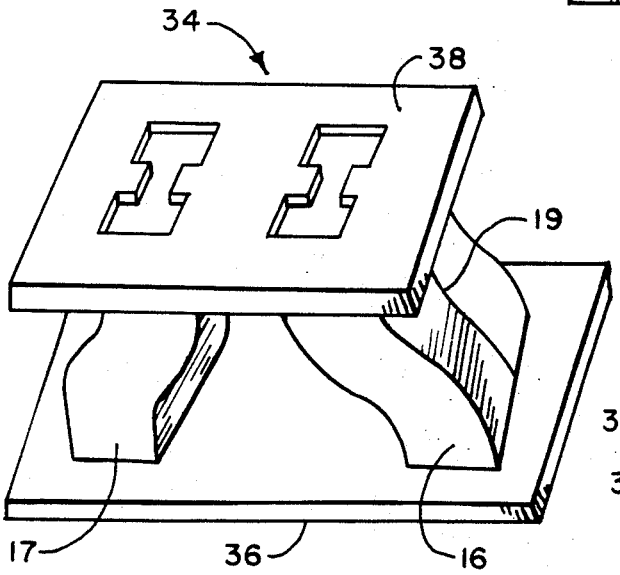
FIG. 4 is a perspective view of an alternative embodiment of the present invention.

Referring now to FIG. 4, there is shown an alternative embodiment of the invention which is a double channel waveguide. In the alternative configuration 34 of FIG. 4, a double channel S-bend waveguide assembly is shown configured in practice of the present invention. In this embodiment, flange plates 12, 14 take the form of flange plates 36, 38 and S-bend waveguide section 16 is now accompanied by a parallel S-bend waveguide section 17. In this embodiment, S-bend waveguide section 16 is comprised of the two mirror image elements 16*a*, 16*b*, as described earlier. S-bend 17 is configured in a like manner.

In practice of the present invention, elements 16*a*, 16*b* of a typical S-bend waveguide section 16 are each milled out of separate pieces of the same composition and are mated together to form a single operative waveguide section having ends 23, 25. Elements 16*a*, 16*b* are joined by soldering, brazing or the like at seam 19. Flange plate 12 is affixed at its interior face at pocket 30 to end 23 of waveguide section 16. Flange plate 14 is affixed at its interior face at pocket 30 to end 25 of waveguide section 16. Waveguide section 16 is mated to the interior surfaces of flange plates 12, 14 by soldering, brazing or like means. The recesses 33 of the interior face of flange plate 12 (or 14) are provided to facilitate secure interaction with a square cornered waveguide section 16, as will be appreciated by those of ordinary skill in the art. In an alternative embodiment, after the two complimentary elements 16*a*, 16*b* are mated together and are then mated with flange plates 12, 14, this unit can be soldered or dip brazed to for one complete pressure-tight waveguide assembly.

Waveguide section 16 may be produced by use of a numerically controlled milling machine, or the like, and depending on whether or not it is to possess double ridges, a specially ground end mill may be employed to create such ridges. This mill has a specially ground nicked down area a small distance away from the cutting end. Such a configuration allows the mill to pass down the desired path within element 16*a*, 16*b* while cutting a ridged C-shaped cross-section, as will be understood by those skilled in the art. Meanwhile, a standard mill can be employed to cut a flat C-shaped cross-section, if desired.

It will thus be appreciated that in operation of the present invention, whereby a waveguide section 16 (or 17) is comprised of two complimentary halves, sufficient machining access is attained for all of the interior surfaces which are responsible for directing microwave energy. Because of this machining accessibility, several advantages are gained over the presently available waveguides. These advantages include that an S-bend waveguide section can be machined to almost any offset required whether it be a long or short overall length. The inner walls thereof can also be machined to possess double ridges for double ridged waveguide applications or the ridges may be left out entirely if a flat surface waveguide is desired. Furthermore, because numerical control type machining can be employed, a waveguide assembly can be produced to provide specific electrical qualities with optimal VSWR for any application in single unit quantities, and can be reproduced to provide identical waveguide sections in any quantity.

It will be further appreciated that any configuration other than S-bend waveguide assembly can be produced in practice of the present invention, and while the present invention has been described in connection with a rather specific preferred embodiment thereof, it will be understood that many modifications and variations will be readily apparent to those of ordinary skill in the art and that this application is intended to cover any adaptation or variation thereof. Therefore, it is manifestly intended that this invention be only limited by the claims and equivalents thereof.

We claim:

1. A waveguide for connecting two waveguide ports of offset waveguides, said waveguide comprising:

a waveguide section, said waveguide section being rectangularly shaped in a transverse direction perpendicular to an energy flow and being S-bend shaped in a longitudinal direction parallel to said energy flow, said waveguide section having a first element and a second element for forming a conductive waveguide chamber, said second element being a complimentary mirror-image of said first element such that when said first and said second elements are fixedly joined by brazing said conductive waveguide chamber is formed therebetween, each of said elements being C-shaped in said transverse direction and having three walls unitarily formed with right angles in said transverse direction, said section having parallel end faces, said section being formed of a metallic material that allows the transmission of microwave energy therethrough without significant loss, said section formed to minimize voltage standing wave ratio, a first flange plate, said first flange plate having an interior face and an exterior face, said first flange plate having means for mounting, said exterior face being mounted by said means for mounting to one of said waveguide ports, said interior face being fixedly attached to one of said end faces of said waveguide section, said interior face having a closely fitting recess therein for fixedly holding by brazing said waveguide section, said first flange plate having a port therethrough for allowing said microwave energy to pass between said waveguide section and said offset waveguides with a minimum of loss; and a second flange plate, said second flange plate being similar to said first flange plate in shape, said second flange plate mounted to the other of said end faces of said waveguide section and to the other of said offset waveguides, each of said flange plates being essentially parallel to said waveguide ports of attachment.

* * * * *